United States Patent
Jiang et al.

(10) Patent No.: US 10,197,827 B2
(45) Date of Patent: Feb. 5, 2019

(54) INSPECTION JIG AND METHOD FOR DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shenghua Jiang, Beijing (CN); Yunxiang Jiao, Beijing (CN); Lei Sun, Beijing (CN); Xudong Han, Beijing (CN); Song Wei, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 15/262,496

(22) Filed: Sep. 12, 2016

(65) Prior Publication Data

US 2017/0219857 A1    Aug. 3, 2017

(30) Foreign Application Priority Data

Feb. 3, 2016   (CN) .......................... 2016 1 0076962

(51) Int. Cl.
  *G02F 1/13*   (2006.01)
  *G01B 5/28*   (2006.01)
  *G01M 1/00*   (2006.01)

(52) U.S. Cl.
  CPC ............. *G02F 1/1309* (2013.01); *G01B 5/28* (2013.01); *G01M 1/00* (2013.01); *G02F 2203/69* (2013.01)

(58) Field of Classification Search
  CPC .. G01R 31/40; G01R 31/2841; G01R 31/001; G01R 31/2889; G01L 27/002
  (Continued)

(56) References Cited

U.S. PATENT DOCUMENTS 7,019,535 B2 *   3/2006   Adamian ............. G01R 35/005
                                                           324/601
2004/0246004 A1 *  12/2004  Heuermann .......... G01R 27/32
                                                           324/601
(Continued)

FOREIGN PATENT DOCUMENTS

CN      201145789 Y    11/2008
CN      201285427 Y     8/2009
(Continued)

OTHER PUBLICATIONS

The First Chinese Office Action dated Jan. 29, 2018; Appln. No. 201610076962.4.

*Primary Examiner* — Giovanni Astacio-Oquendo
(74) *Attorney, Agent, or Firm* — Ladas & Parry LLP

(57) ABSTRACT

An inspection jig for a display device includes a jig body, the jig body includes a limit groove configured to limit the position of the display device to be inspected, and the jig body is provided with a soldering point testing portion, the soldering potin testing portion is provided with a plurality of testing terminal pairs; each of the testing terminal pairs comprises two testing terminals; in every two adjacent testing terminal pairs, one testing terminal of one testing terminal pair and one testing terminal of the other testing terminal pair are serially connected with an indicator lamp therebetween; along a serial connection direction of the testing terminals, a testing terminal located at two ends are electrically connected with a positive pole and a negative pole of a power source.

11 Claims, 2 Drawing Sheets

(58) Field of Classification Search
USPC .................................. 324/750.01, 500, 537
See application file for complete search history.

(56) References Cited

U.S. PATENT DOCUMENTS

| | | | |
|---|---|---|---|
| 2007/0041511 A1* | 2/2007 | Tan ...................... | G01R 13/029 |
| | | | 379/30 |
| 2007/0276614 A1* | 11/2007 | Tan ........................ | G01R 27/32 |
| | | | 702/55 |
| 2008/0004819 A1* | 1/2008 | Namba .................. | G01R 27/28 |
| | | | 702/65 |
| 2015/0323592 A1* | 11/2015 | Zhao ................... | G01R 31/2889 |
| | | | 324/756.05 |
| 2015/0357216 A1* | 12/2015 | Chen ................. | H01L 21/67271 |
| | | | 209/577 |
| 2017/0115141 A1* | 4/2017 | Kurahashi .............. | G01D 13/02 |

FOREIGN PATENT DOCUMENTS

| | | |
|---|---|---|
| CN | 204086443 U | 1/2015 |
| CN | 104793074 A | 7/2015 |

\* cited by examiner

INSPECTION JIG AND METHOD FOR DISPLAY DEVICE

TECHNICAL FIELD

The embodiments of the present disclosure relate to an inspection jig for a display device, and an inspection method.

BACKGROUND

At present, in the display technical field, a backlight source, an LCD (Liquid Crystal Display) panel, a flexible circuit board and other elements are assembled together to realize display function. The backlight source and the LCD panel, or the backlight source and the flexible circuit board are respectively assembled to corresponding elements through a soldering process for example. During the manufacturing process, the soldering procedure of a backlight source and a flexible circuit board requires manual operations, however, it is hard to avoid poor soldering, internal solder connection, pseudo soldering or the other problems, and the rework caused by poor soldering and so on will give rise to losses of resources and materials such as flexible circuit boards, ICs and backlight sources. However, poor soldering, internal solder connection and pseudo soldering and other problems can not inspected directly by human eyes.

SUMMARY

An embodiment of the present disclosure provides an inspection jig for a display device, which comprises a jig body. The jig body comprises a limit groove configured to limit a position of a display device to be inspected, and the jig body is provided with a soldering point testing portion, the soldering point testing portion is provided with a plurality of testing terminal pairs; each of the testing terminal pairs comprises two testing terminals; in every two adjacent testing terminal pairs, one testing terminal of one testing terminal pair and one testing terminal of the other testing terminal pair are serially connected with an indicator lamp therebetween; along a serial connection direction of the testing terminals in the plurality of testing terminal pairs, a testing terminal located at one end is configured to be electrically connected with a positive pole of a power source, and a testing terminal located at the other end is configured to be electrically connected with a negative pole of the power source.

Another embodiment of the present disclosure provides an inspection method, comprising: placing the display device to be inspected into a limit groove of a jig body of an inspection jig, wherein the display device to be inspected has been subjected to an attaching process of soldering a flexible circuit board, and between a soldering point testing portion of the inspection jig and a backlight source bonding pad region of the display device to be inspected, each testing terminal pair of the soldering point tesitng portion is electrically connected with a corresponding soldering point in the backlight source bonding pad region of the display device; and switching on a power source so as to test the soldering point of the backlight source bonding pad region.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the disclosure and thus are not limitative of the present disclosure.

DETAILED DESCRIPTION

In order to make objects, technical solutions and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
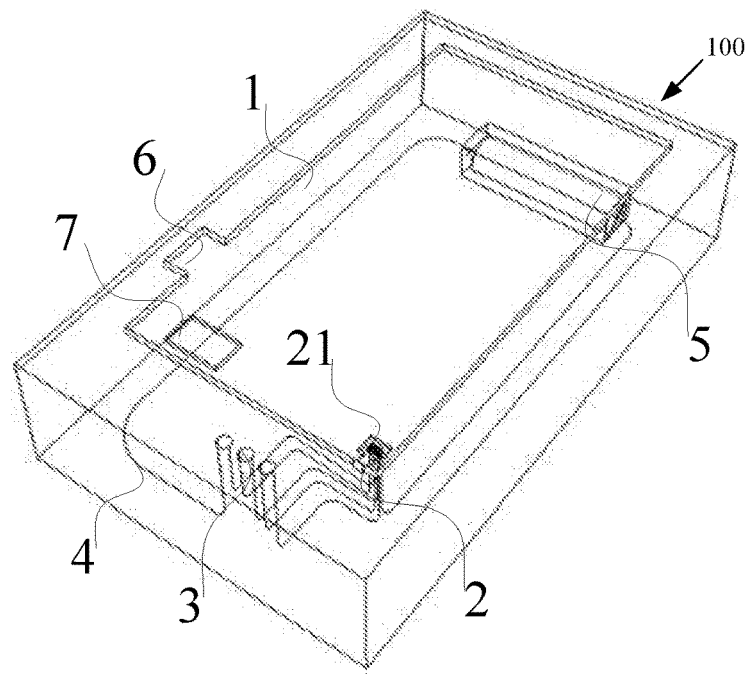
FIG. 1 is an exemplary structural schematic view of an inspection jig for a display device provided by an embodiment of the present disclosure.
Figure 2:
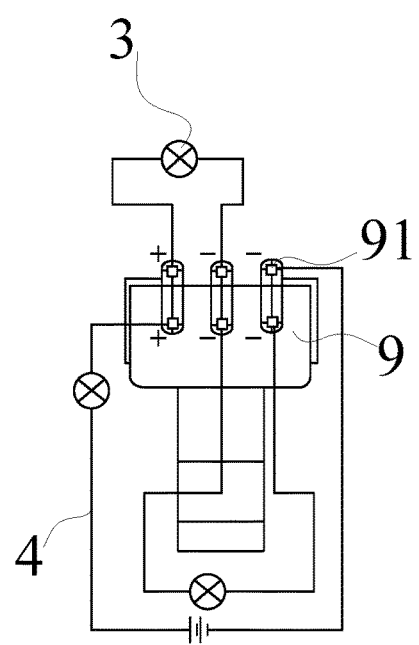
FIG. 2 is a circuit diagram for inspecting soldering point in an inspection jig for a display device provided by the embodiment of the present disclosure.
Figure 3:
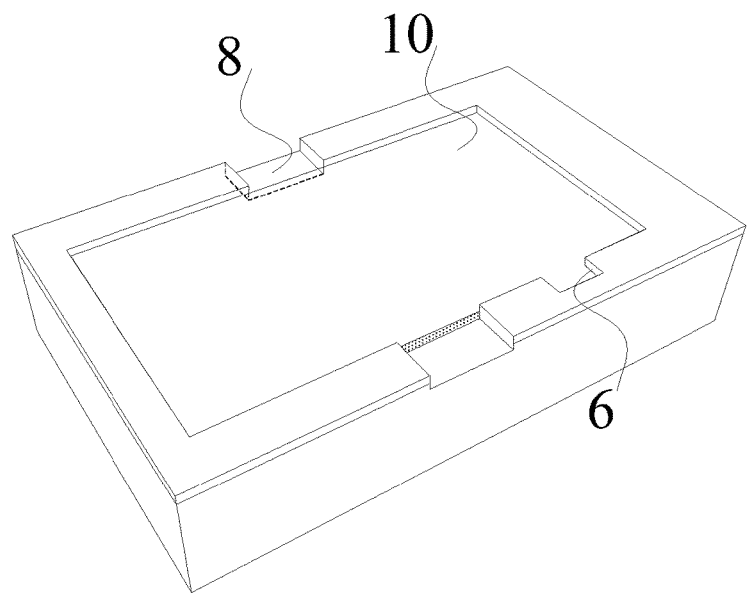
FIG. 3 is another exemplary structural schematic view of an inspection jig for a display device provided by the embodiment of the present disclosure.

As illustrated by FIGS. 1, 2 and 3, an embodiment of the present disclosure provides an inspection jig (or fixture) for a display device, which comprises a jig body 100, the jig body 100 comprises a limit groove (container) 1 configured to limit the position of a display device 10 to be inspected during inspection, and the jig body 100 is provided with a soldering point testing portion 2 corresponding to a backlight source bonding pad region 9 (for example, a through-type bonding pad), and the soldering point testing portion 2 is provided with a testing terminal pair 21, and the testing terminals, one by one, correspond to soldering points 91 of the backlight source bonding pad region 9.

In each group of the testing terminal pair 21 and soldering points 91 which correspond to the testing terminal pair, the testing terminal pair 21 comprises two testing terminals, which are electrically connected with the soldering points 91 in the state of inspection.

In every two adjacent testing terminal pairs 21, one testing terminal of one testing terminal pair 21 and one testing terminal of the other testing terminal pair 21 are provided with a wire 4 connecting an indicator lamp 3 therebetween.

Along the serial connection direction of the testing terminals in the plurality of testing terminal pairs 21, a testing terminal located at an end is used to electrically connect with a positive pole of a power source 5, and a testing terminal located at the other end is used to electrically connect with a negative pole of the power source 5. The power source may be a battery or a battery pack for example.

For example, the shape of the limit groove 1 is of a rectangle shape as a whole, which corresponds to the shape of the display device (a liquid crystal panel) to be inspected.

In the abovementioned inspection jig for a display device, in operation the display device 10 to be inspected is placed within the limit groove 1 of the inspection jig, for example, mounted within the limit groove 1, the testing terminal pairs 21 of the soldering point testing portion and the soldering points 91 of the backlight source bonding pad region 9 are contacted one by one, so that the testing terminals in the testing terminal pairs 21 can be electrically connected with the soldering points 91 of the backlight source bonding pad region 9. At this time, after the inspection jig is switched on (i.e., powered on), if all indicator lamps 3 are lit on, the loop constituted by the soldering points 91 and the testing terminals does not suffer from a short circuit, namely, does not have poor soldering, which indicates that the display device 10 is properly soldered. If a portion of the indicator lamps 3 are not lit on, the loop constituted by the soldering points 91 and testing terminals suffers from a short circuit, namely, the soldering point(s) 91 adjacent to the indicator lamp 3 which is not lit on suffers from solder internal connection problem, which means that the display device 10 is not properly soldered, and there is a defective point for at least one soldering point 91 where the indicator lamp 3 is not lit on. If all indicator lamps 3 are not lit on, the loop constituted by the soldering point 91 and the testing terminals suffers from a break circuit phenomenon, namely, the soldering point(s) 91 adjacent to the indicator lamp 3 which is not lit on may suffer from a pseudo soldering problem, which means that the display device 10 is not properly soldered.

Therefore, the abovementioned inspection jig for a display device can perform a specific test at the soldering position based on a circuit principle, finds out a defective point and effectively intercepts poor soldering.

As illustrated by FIGS. 1 and 3, in an embodiment of the present disclosure, on the basis of inspecting the soldering conditions of a display device, in order to further inspect the attaching conditions of a flexible circuit board of the display device, the abovementioned inspection jig for a display device may further comprise a trough or notch 6 formed in the jig body, the trough 6 is configured to allow an external extension portion of the flexible circuit board to pass therethrough only if the flexible circuit board is properly attached to the display panel of the display device, and the flexible circuit board that is properly mounted does not contact the side walls of the trough 6 upon being inserted in the trough 6 upon the display device being placed into the inspection jig. For example, the trough 6 can be disposed at a long edge side of the limit groove 1 with a rectangle shape. The flexible circuit board can be attached to the display panel of the display device with anisotropy conductive adhesive. A portion of the flexible circuit board may extend outside of the display panel of the display device, and this portion can be referred to as the external extension portion.

The design of the trough 6 on the jig body is made according to the state in which the flexible circuit board is properly attached on the display device 10. If the display device 10 is properly attached with the flexible circuit board, the external extension portion of the flexible circuit board can be inserted in and pass through the trough 6 without any action of an external force, and the flexible circuit board does not contact the side walls of the trough 6 when it is inserted through the trough 6. Therefore, the inspection jig in which the jig body is provided with a trough 6 can be used to inspect the attaching state of the flexible circuit board of the display device.

When the display device 10 can be inserted through the trough 6 without any action of an external force and the flexible printing board does not contact the side walls of the trough 6, it can be judged that the flexible circuit board is properly attached. When the display device 10 cannot be completely placed through the trough 6, it can be judged that the flexible circuit board is not attached properly. When the display device 10 contacts the side walls of the trough 6 upon being inserted through the trough 6, it can be judged that the flexible circuit board is not attached properly.

As illustrated by FIG. 3, in an embodiment of the present disclosure, during inspecting the soldering conditions of the display device 10, in order to conveniently take or place the display device 10, the jig body can be further provided with an opening 8 at the periphery of the limit groove 1 for a user to conveniently take out the display device 10 from the limit groove or place it in the limit groove.

For example, openings 8 can be disposed at two sides of the limit groove 1 in symmetry, and run through the side walls of the limit groove 1 in the thickness direction. The opening or openings 8 may be in a square shape, and the specific size of the opening 8 can be selected according to the shape and size of the display device 10 as well as the inspection jig in the premise of guaranteeing that the display device 10 can be taken and placed conveniently.

As illustrated by FIG. 1 and FIG. 3, in an embodiment of the present disclosure, upon inspecting the soldering conditions of the display device, in order to avoid the electronic devices in the display device 10 from being damaged, the jig body 100 may be further provided with one or more electronic device concaves 7 for containing the electronic device(s) of the display device 100. The electronic device(s) is for example mounted in the state of projection out of the surface (e.g., on the back side) of the display device.

In the inspecting process of soldering conditions of the display device 10, the surface of the electronic device(s) contacts the wall of the limit groove 1 may suffer from friction caused by the relative movement between the electronic device(s) and the wall, or, the electronic elements will be damaged due to the reasons such as the display device 10 is subjected to an external pressing force in the limit groove 1; however, in the inspecting process of the soldering conditions of the display device 10, the problem of being damaged can be resolved by containing the electronic devices within the electronic device groove(s) 7.

As illustrated by FIG. 1 and FIG. 3, in an embodiment of the present disclosure, the inspection jig can perform a specific test at the soldering position based on a circuit principle, in order to make the inspection jig normally work, the jig body may be further provided with a power source groove 5, and the power source groove 5 may be configured to contain a battery for inspecting the display device therein.

During the inspecting process of the soldering conditions of the display device 10, the battery can provide power supply to the inspection jig, so as to electrically connect the testing terminals in the testing terminal pairs 21 and the soldering points 91, so as to perform the subsequent inspection processes.

As illustrated by FIG. 1, in a preferably embodiment of the present disclosure, every indicator lamp 3 can be embedded in the jig body 100, for example, in the surface of the jig body 100. It is convenient for carrying and transporting the inspection jig if every indicator lamp 3 is embedded in the jig body 100. Besides, every indicator lamp 3 can be externally connected to the jig body 100 if required in practice.

Figure 4:
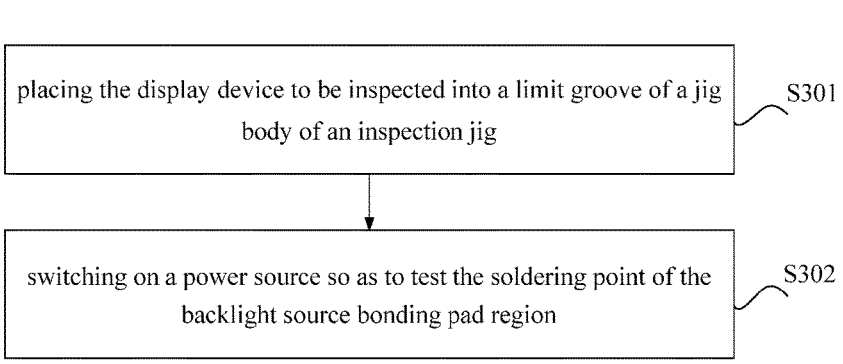
FIG. 4 is a flow diagram of an inspection method provided by an embodiment of the present disclosure.

As illustrated by FIG. 3 and FIG. 4, the embodiments of the present disclosure provide an inspection method, comprising the following steps.

Step S301, the display device 10 to be inspected is placed into the limit groove 1 of a jig body, for example, the display device 10 to be inspected is such a display device that has been subjected to an attaching process of soldering a flexible circuit board thereto but prior to the other processes after the attaching process of a flexible circuit board. Between the soldering point testing portion 2 of the inspection jig for a display device and the backlight source bonding pad region 9 of the display device 10 to be inspected, each of the testing terminal pairs 12 is electrically connected with the corresponding soldering points 91 in the backlight source bonding pad region 9.

Step S302, the power source 5 is switched on to inspect the soldering points 91 of the backlight source bonding pad region 9.

If all indicator lamps 3 are lit on, it can be judged that the display device 10 is properly soldered. If only a portion of the indicator lamps 3 are lit on, it can be judged that the current display device 10 has an internal solder connection problem, and the soldering points 91 corresponding to the indicator lamp 3 that is not lit on is a defective point. If all indicator lamps 3 are not lit on, it can be judged that the current display device 10 suffers from pseudo soldering.

In the abovementioned inspection method, the inspection of the soldering conditions can be performed after finishing the soldering process and before the attaching process of the flexible circuit board. The display device 10 to be inspected is placed into the limit groove 1 according to the step S301 and the inspection circuit is powered on, and then it is judged whether a defective point is present or not according to the on-off states of the indicator lamps 3 in the step S302, and the position and type of the defective point can be spotted.

For example, on the basis of the abovementioned inspection method, in order to inspect the attaching conditions of the flexible circuit board to a display device, in a case where the inspection jig for a display device further comprises a trough 6 which is configured to allow the flexible circuit board to pass through only if the flexible circuit board of the display device 10 is properly attached, and the inspection method for the display device 10 to be inspected comprising a flexible circuit board attached thereto further comprises: judging the attaching state of the flexible circuit board according to whether or not an external extension portion of the flexible circuit board can pass through the trough 6. When the display device 10 with the flexible circuit board call pass through the trough 6 without any action of an external force and does not contact an inner wall of the trough 6, it can be judged that the current flexible circuit board is properly attached; when the display device 10 cannot be completely placed in the trough 6, it can be judged that the flexible circuit board is not properly attached; and when the display device 10 contacts the an inner wall of the trough 6 upon being placed in the trough 6, it can be judged that the flexible circuit board is not properly attached.

The reason that the inspection method can inspect the attaching conditions of the flexible circuit board is: the trough 6 formed on the jig body is designed based on the display device 10 which is properly attached with a flexible circuit board, thus, the display device 10 which can be placed in the trough 6 is such a display device 10 that is properly attached with a flexible circuit board, and a display device 10 which cannot be placed in the trough 6 is a display device 10 in which the flexible circuit board is not properly attached. Therefore, the attaching conditions of the flexible circuit board can be checked and inspected through the abovementioned inspection method.

The foregoing are merely specific embodiments of the disclosure, but not limitative to the protection scope of the present disclosure. Therefore, the protection scope of the disclosure should be defined by the accompanying claims.

The present disclosure claims the benefits of Chinese patent application No. 201610076962.4, which was filed with the SIPO on Feb. 03, 2016 and is fully incorporated herein by reference as part of this application.

What is claimed is:

1. An inspection jig for a display device, comprising a jig body,
    wherein the jig body comprises a limit groove configured to limit a position of the display device to be inspected, and the jig body is provided with a soldering point testing portion, the soldering point testing portion is provided with a plurality of testing terminal pairs;
    each of the testing terminal pairs comprises two testing terminals;
    in every two adjacent testing terminal pairs, one testing terminal of one testing terminal pair and one testing terminal of the other testing terminal pair are serially connected with an indicator lamp therebetween;
    along a serial connection direction of the testing terminals in the plurality of testing terminal pairs, a testing terminal located at one end is configured to be electrically connected with a positive pole of a power source, and a testing terminal located at the other end is configured to be electrically connected with a negative pole of the power source.

2. The inspection jig for a display device according to claim 1, further comprising a trough disposed on the jig body,
    wherein the trough is configured to allow an external extension portion of an flexible circuit board of the display device to pass through only if the flexible circuit board of the display device is properly attached and the flexible circuit board does not contact side walls of the trough upon being inserted in the trough.

3. The inspection jig for a display device according to claim 1, wherein the jig body is provided with an opening located at a periphery of the limit groove and configured for taking or placing the display device.

4. The inspection jig for a display device according to claim 1, wherein the jig body is further provided with an electronic device groove configured to contain an electronic device of the display device therein.

5. The inspection jig for a display device according to claim 1, wherein the jig body is further provided with a power source placement groove, and the power source placement groove is configured to contain a battery therein.

6. The inspection jig for a display device according to claim 1, wherein each of the indicator lamp is embedded in the jig body.

7. An inspection method of a display device, comprising:
    placing the display device to be inspected into a limit groove of a jig body of an inspection jig, wherein the display device to be inspected has been subjected to an attaching process of soldering a flexible circuit board, and between a soldering point testing portion of the inspection jig and a backlight source bonding pad region of the display device to be inspected, each testing terminal pair of the soldering point tesitng portion is electrically connected with a corresponding soldering point in the backlight source bonding pad region of the display device; and
    switching on a power source so as to test the soldering point of the backlight source bonding pad region.

8. The inspection method according to claim 7, wherein if all indicator lamps are lit on, it is judged that the display device is properly soldered;
    if a portion of the indicator lamps are lit on, it is judged that the display device has suffered from an internal solder connection problem, and a soldering point corresponding to the indicator lamp which is not lit on is a defective point; and if all indicator lamps are not lit on, it is judged that the display has suffered from a pseudo soldering problem.

9. The inspection method accoridng to claim 8, wherein the inspection jig for a display device further comprises a trough configured to allow the display device pass through only if a flexible circuit board of the display device is properly attached to the display device, and the display device to be inspected has been subjected to an attaching process of the flexible circuit board, the inspection method further comprises:

judging an attaching state of the flexible circuit board according to whether or not an external extension portion of the flexible circuit board can pass through the trough.

10. The inspection method according to claim 9, wherein if the display device passes through in the trough without action of an external force and does not contact an inner wall of the trough, it is judged that the flexible circuit board is properly attached;

if the display device can not be completely pass through the trough, it is judged that the flexible circuit is not well attached; and if the display device contacts an innder wall of the trough after being placed in the trough, it is judged that the flexible circuit board is not well attached.

11. The inspection method according to claim 7, wherein the display device to be inspected has not been subjected to other processes after the attaching process of a flexible circuit before the inspection method is conducted.

\* \* \* \* \*